US005992277A

United States Patent [19]
Dalseide

[11] Patent Number: 5,992,277
[45] Date of Patent: Nov. 30, 1999

[54] APPARATUS FOR CLEANING OF THE PERIPHERAL SURFACE ON A CYLINDRICAL PART

[75] Inventor: Bjørn Ove Dalseide, Bekkjarvik, Norway

[73] Assignee: Dalseide & Co., Bekkjarvik, Norway

[21] Appl. No.: 08/750,140

[22] PCT Filed: May 29, 1995

[86] PCT No.: PCT/NO95/00083

§ 371 Date: Nov. 26, 1996

§ 102(e) Date: Nov. 26, 1996

[87] PCT Pub. No.: WO95/33583

PCT Pub. Date: Dec. 14, 1995

[30] Foreign Application Priority Data

Jun. 2, 1994 [NO] Norway .................................... 942043

[51] Int. Cl.[6] ........................................................ B23C 5/16

[52] U.S. Cl. .................................. 82/130; 82/53; 82/53.1; 82/70.2; 82/113; 15/93.1

[58] Field of Search .................................. 82/130, 53, 83, 82/70.2, 71, 80, 81, 84, 86; 15/93.1, 103.5, 104.04

[56] References Cited

U.S. PATENT DOCUMENTS

| | | | |
|---|---|---|---|
| 2,715,235 | 8/1955 | Dawson | 15/104.04 |
| 3,387,480 | 6/1968 | Eaker et al. | 82/130 X |
| 4,124,914 | 11/1978 | Buzhinsky et al. | 15/93 R |
| 5,001,801 | 3/1991 | Jarvis et al. | 15/93.1 |
| 5,056,388 | 10/1991 | Dekker et al. | 82/70.2 X |

*Primary Examiner*—Andrea L. Pitts
*Assistant Examiner*—Henry W. H. Tsai
*Attorney, Agent, or Firm*—McAulay Nissen Goldberg Kiel & Hand

[57] ABSTRACT

The apparatus for scraping a cylindrical part includes a rotor and a stator. The rotor is equipped with power-driven arrangements which cooperate with power-driving arrangements on the stator for turning of the rotor relative to the stator. The rotor is formed of two parts which are joined together to form a rigid annular rotor. The rotor is freely rotatably mounted and is equipped with a set of support rollers and a set of scrapers which are controlled by centrifugal force during rotation of the rotor.

15 Claims, 4 Drawing Sheets

APPARATUS FOR CLEANING OF THE PERIPHERAL SURFACE ON A CYLINDRICAL PART

Hitherto it has been a problem to achieve a simple and effective operation of the rotor together with a simple and rapid fixing of a cleaning apparatus in engagement with the object which is to be cleaned. This is especially the case where it is desirable to clean a pipe member in a pipe conduit or similar cylindrical member in a larger construction, where the apparatus is readily able to be mounted and dismounted with a simple grip by manual handling. Further it has been a problem to achieve a proper and accurate cleaning effect.

In U.S. Pat. No. 3,820,184 it is shown an apparatus of the type described above. An annular rotor is at a local upper portion thereof supported on bearings located at a lower portion of a house shaped stator. A local gear rimmed section of the rotor is being clamped between an upper gear rim of a driving pinion within the stator and said bearings at the lower portion of the stator. If not supported by separate support means, the apparatus is to be supported locally on the part to be treated by means of brush bristles suspended at the inner rim of the annular rotor. This means that a brushing effect is dependent of the gravity of apparatus and that the brushing effect is mainly obtained by means of a gravity force acting locally in the apparatus. In practice the brushing effect is provided by one or two brush bristles at a time.

Apparatuses of the afore-mentioned kind are also shown in U.S Pat. Nos. 2,299,523, 2,635,270, 2,657,409, 2,715,235, 4,124,914 and 5,001,801, which all have a holder member which is supported directly against the cylindrical part by means of support wheels mounted in the holder member.

In U.S. Pat. No. 4,124,914 the apparatus is supported directly against the cylindrical part to be treated by means of a first upper forward pair of wheels and a second upper rearward pair of wheels. An apparatus of this kind has a rather voluminous and heavy structure and accordingly a restricted application in practice. Such structure require extra working space and allows the apparatus to operate solely on rectilinear parts, i.e. cylindrical parts without curvatures or bendings. A double-arm lever having a tool at one end thereof and a counterweight at the opposite end thereof provides cleaning by centrifugal forces developed at the counterweight during rotation of the rotor. This means that the rotor of the apparatus is accurately supported on the cylindrical part to be treated and that the cleaning is provided by separate cleaning means acting independently of the support but being dependent of said accurate support to operate properly.

With the present invention the aim is to provide a cleaning apparatus for scraping off or like removal of rust, paint or other deposits from the peripheral surface on a cylindrical or substantially cylindrical part. More precisely the apparatus is particularly designed for accurate and circumferentially evenly distributed cleaning effect on a great variety of different cylindrical parts, including rectilinear parts and parts with curvatures, bendings and other irregular surfaces. In this respect the aim of the present invention is to provide an adjustable scraping or like removal effect on the part to be treated and simultaneously to provide an adjustable wheel or roller support in combination therewith.

The main aim of the present invention is in this respect to provide a cleaning apparatus which has a simple and effective structure and has an efficient action on the part to be treated simultaneously as it is efficiently supported on the part to be treated and thereby is easy to handle in practical use.

Briefly, the invention provides a pipe cleaning apparatus comprising a holder means, a rotor mounted in the holder means for rotation about a central longitudinal axis thereof and a power-driven drive means mounted on the holder means for rotating the rotor relative to the holder means about the longitudinal axis of the rotor. In addition, the pipe cleaning apparatus includes a plurality of centering mechanisms which are mounted on the rotor for centering the rotor relative to a pipe disposed within the rotor under centrifugal force during rotation of the rotor about the pipe in dependence on the speed of rotation of the rotor.

Still further, the apparatus includes a plurality of scraper mechanisms mounted on the rotor for scraping a surface of the pipe under centrifugal force during rotation of the rotor in dependence on the speed of rotation of the rotor.

The apparatus according to the invention is characterised in that the rotor comprises a set of scraper means, each of which is located at a first end of and a counterweight at the opposite end of a double-armed lever and each of which is movable in direction towards and away from said rotation axis by means of a centrifugal force provided by rotation of the rotor, the rotor is supported on the stator by a first set of mutually spaced, stationary support rollers, that the rotor is to be supported on the cylindrical part by a second set of adjustable support rollers, that each support roller of said second set of rollers is located, together with an associated one of said scraper means, at said first end of said double-armed lever, and that each support roller of said second set of support rollers is separately adjustable in radial direction in respect of the rotation axis of the rotor by means of centrifugal forces provided by rotation of the rotor, causing said rotation axis to coincide with the axis of the cylindrical part.

According to the invention an apparatus is provided which can be subjected regulatably to a cleaning effect by subjecting the associated scraper means to a regulatable tension force based on a regulatable centrifugal force in connection with regulating the rotational speed of the rotor which carries the scraper means. In practice the support of the weight of the apparatus will be evenly distributed on the part to be treated by a number of support wheels or rollers and a number of scraper means caused by a centrifugal force acting on the latter, provided by the rotation of the rotor.

According to the invention the possibility exists of effecting ready movement of the apparatus in the longitudinal direction of the cylindrical part as a consequence of the floating mounting of the apparatus on the cylindrical part. In this connection an effective centering of the apparatus can be ensured relative to the cylindrical part together with an effective scraping effect with equivalent centering of the scraper means.

In connection with said centering effect one can according to the invention mount support wheels or rollers and associated scraper means about one and the same pivotal axis and/or actuate these jointly by means of a common weight means. It is also possible to control the centering movements of each and all of the support wheels or rollers with a common annular control means, so that the support wheels or rollers are moved jointly towards and away from the cylindrical part.

Further features of the present invention will be evident from the following description having regard to the accompanying drawings, wherein:

FIG. 9 shows in cross-section an apparatus according to the invention, designed for relatively thin pipes, for example pipes of hand rails and the like.

Figure 1:
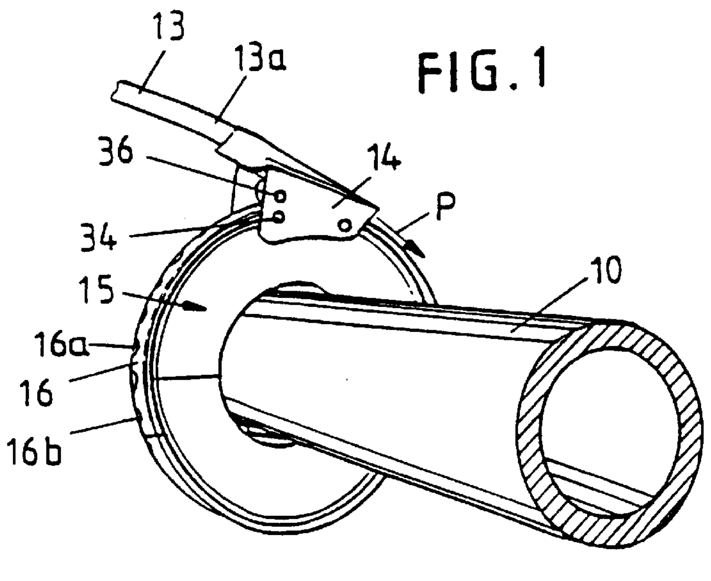
FIG. 1 shows the apparatus according to the invention ready for use for the cleaning of a cylindrical pipe member.

In FIG. 1 a cylindrical part 10 is shown, which is to be cleaned of rust, oxide scale, paint or like deposits, by means of an apparatus 11 according to the invention.

The cylindrical part 10 is shown herein in the form of a rectilinear pipe member, which forms a part of a pipe conduit or a pipe conduit arrangement. The apparatus can also be employed in bent or curved conduit paths. Alternatively the apparatus can be employed on arbitrary objects having essentially cylindrical peripheral portions.

In the illustrated embodiment turbine operation is employed, that is to say pneumatic operation based on a current of compressed air, shown by the arrow P, from a compressed air nozzle (not shown further), but alternatively electrical, hydraulic or other power-driven drive means (not shown further) can be employed.

Figure 3:
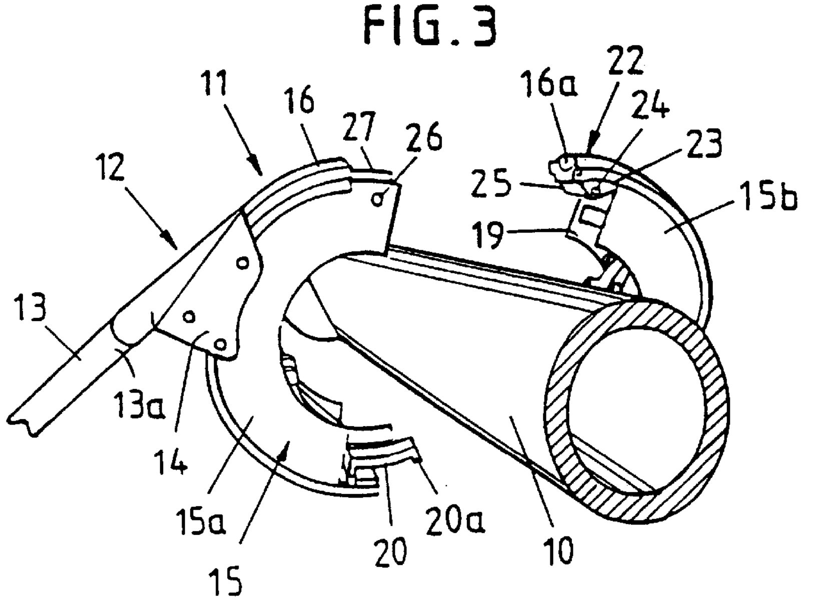
FIGS. 3 and 4 show the two rotor parts in two successive mounting steps.

It is evident from FIG. 3 that the pneumatically driven apparatus 11 consists of a holder means 12 having associated compressed air conduit 13, which with a nozzle opening discharges internally into a housing part 14 in the holder means. Housing part 14 of the holder means 12 engages and locally surrounds a cleaning means 15 in the form of a rigid annular member, which forms a rotor, while the holder means 12 in the form of a simple light weight construction forms a stator in the apparatus 11. The rotor 15 is mounted in the holder means 12 for rotation about a central longitudinal axis. Just by the housing part 14 the compressed air conduit 13 is in the form of a rigid hand grip portion 13*a*. In the construction illustrated the apparatus 11 is floatingly mounted on the part 10, so that it can be moved unhindered longitudinally along the part 10 and can be swung unhindered about the periphery of the part 10. In practice the apparatus can be manually retained in established positions or manually moved sideways along the part 10. Alternatively the apparatus 11 can be fastened in a power-driven control apparatus (not shown further) and be moved in an automatically controlled manner along the pipe member 10.

Figure 2:
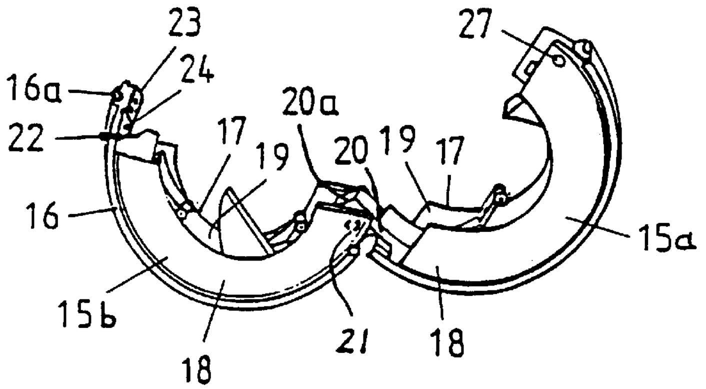
FIG. 2 shows in perspective two rotor parts, which form a part of the apparatus according to FIG. 1, illustrated separately.
Figure 4:
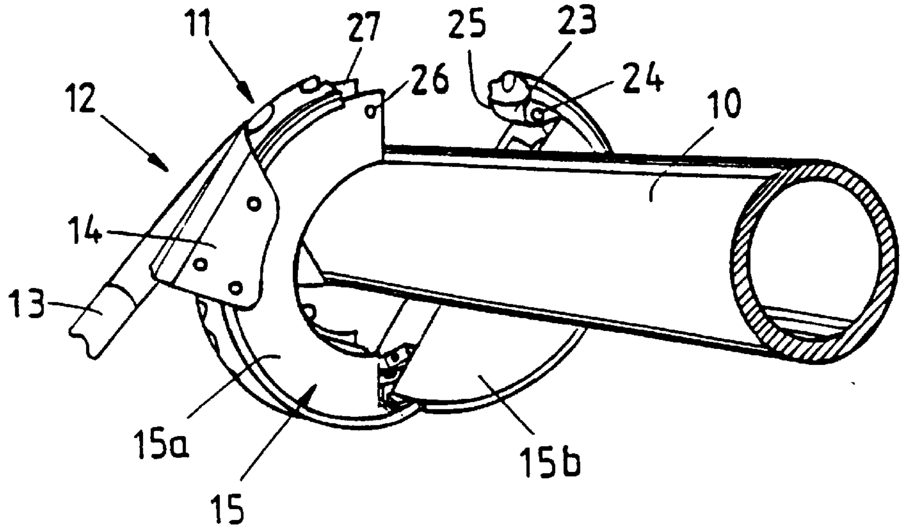

From FIG. 2 it is evident that the annular cleaning means 15 consists of two separate rotor parts 15*a*, 15*b*, which can be clamped in rigid annular form about the pipe member 10, as is indicated in the mounting phases, as illustrated in FIGS. 3 and 4, and in the finally mounted condition, as is illustrated in FIG. 1.

Each rotor part is constructed of an outer, rigid rim portion 16 and two disc-shaped side pieces 17, 18 which define between them an arcuate hollow space or groove 19. The rim portion 16 is provided on its radially outermost peripheral side with a series of recesses 16*a* which in their proper turn thrust tightly up to the nozzle mouth internally in housing part 14 of the holder means 12. It is possible to regulate the drive speed on the rotor 15 by regulating the force of compressed air. This can be effected by means of a control handle not shown further on the apparatus or in another suitable manner.

In the one rotor part 15*a* a hook-carrying first fastening member 20 is fastened in the bottom of the groove 19, at the one end of the rotor part. Associated hook portion 20*a* of the fastening member 20 is adapted, in the mounting phase as is shown in FIG. 3, to be hooked into engagement with a bar-shaped second fastening member 21, which is fastened at the opposing end of the other rotor part 15*b*. In the mounting phase as is illustrated in FIG. 4, the second fastening member 21 is adapted together with the first fastening member 20 to form at the one end of the rotor parts a hinge-forming fastening between the members.

The rotor parts 15*a*, 15*b* are equipped at their other end, opposite the fastening members 20, 21, with a snap lock 22 for intermittent locking together of said other ends of the rotor parts. The rotor part 15*b* is provided with a locking head 23, in which a pair of oppositely directed bolt members 24, 25 are displaceably mounted. By means of an intermediate compression spring (not shown further) the bolt members 24, 25 are tensioned with a spring force in a direction from each other. The rotor part 15*a* is provided equivalently in the opposite side pieces 17, 18 with locking grooves in the form of bores 26, 27. On swinging together the rotor parts 15*a*, 15*b* to a closed annular form the bolt members 24, 25 are snapped into locking engagement in associated bores 26, 27. The locking engagement can be correspondingly removed by pressing in the bolt members 24, 25 from opposite sides of the rotor 12.

Figure 5:
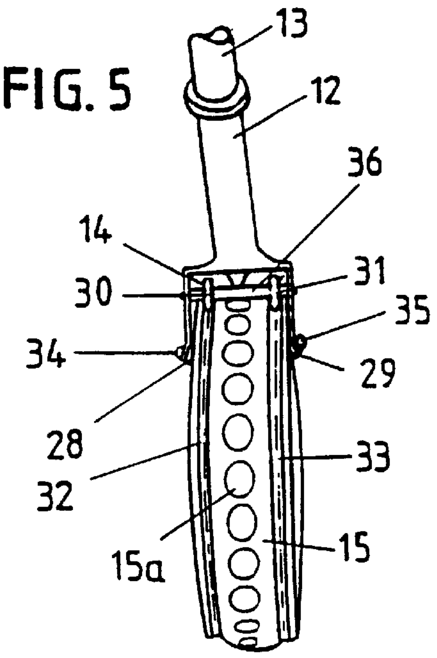
FIG. 5 shows the apparatus in part viewed substantially parallel to the plane of rotation of the rotor.

From FIGS. 3–5 it is evident that the housing part 14 is equipped with a set of radially inner support wheels 28, 29 and a set of radially outer support wheels 30, 31, which are rolled off against flange surfaces on one respectively of two opposite flanges 32, 33 on respectively opposite sides of rim portion 16 of the rotor 15. In FIG. 5 a pair of radially inner support wheels 28, 29 are shown at the one end of the housing part 14, which are mounted on their respective separate pivots 34, 35, and a pair of radially outer support wheels 30, 31, which are mounted on a common pivot 36. As indicated with pivots 34 and 36 respectively in FIGS. 3 and 4 there are arranged a pair of radially inner support wheels and a pair of radially outer support wheels respectively at each end of the housing part 14. The housing part can be guided endwise into place on a rim portion 16 of the rotor part 15*a*, in an easy way before the rotor parts 15*a*, 15*b* are snapped together in the position which is illustrated in FIG. 1.

Figure 6:
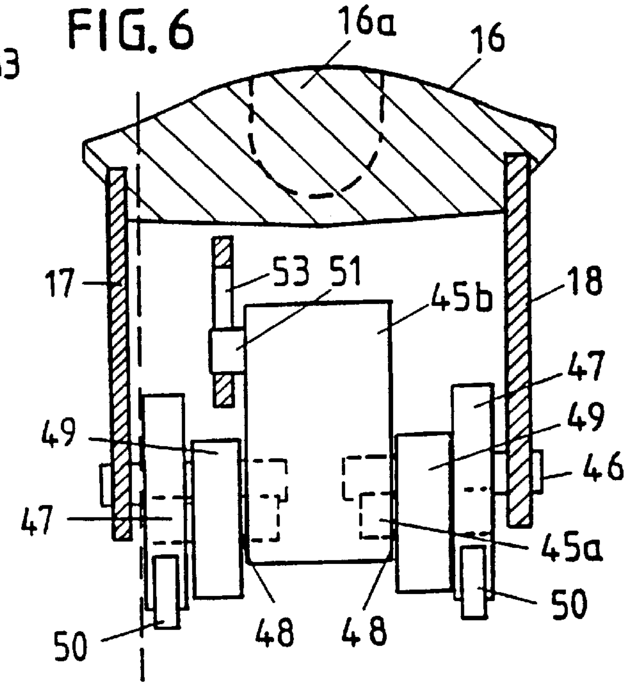
FIG. 6 shows a cross-section through the one rotor part and its one support wheel and scraper means mechanism.
Figure 7:
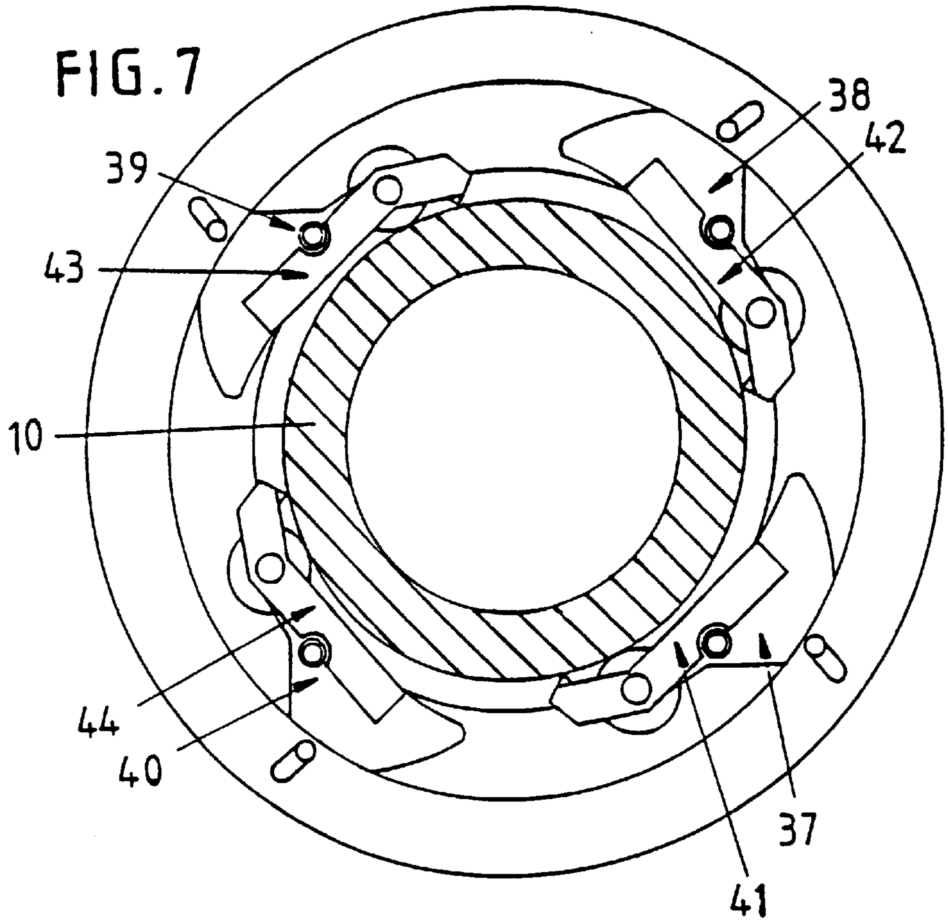
FIG. 7 shows a longitudinal section through the rotor and the associated, four support wheel and scraper means mechanisms illustrated.
Figure 8:
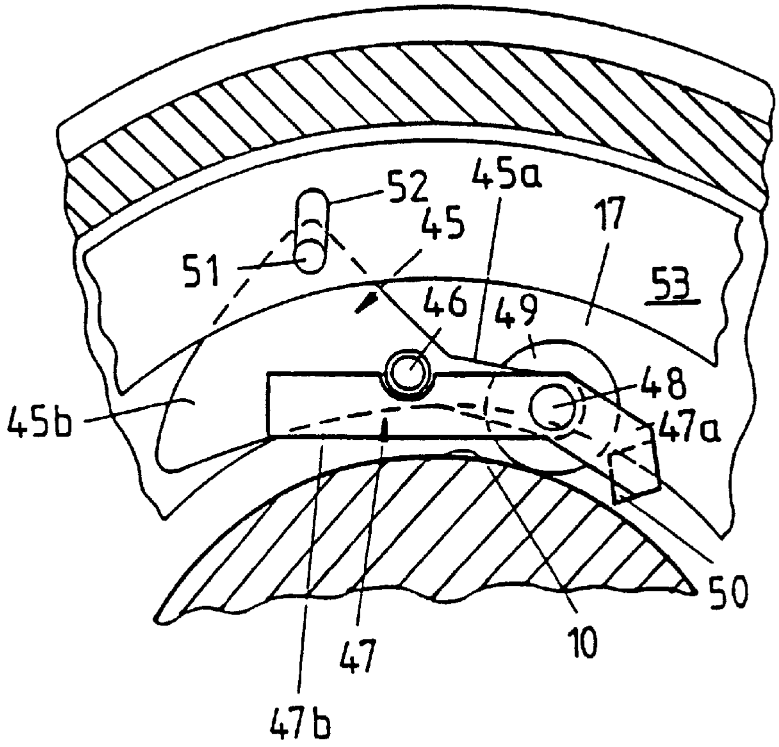
FIG. 8 shows on a larger scale a support wheel and scraper mechanism according to FIG. 7.

As is illustrated in FIGS. 6–8, an arrangement of four support rollers or centering mechanisms 37–40 is arranged internally in groove 19 of the rotor 15, which in the illustrated embodiment are combined with an equivalent four cleaning or scraper mechanisms 41–44. The mechanisms 37–40, 41–44 are adapted during operation respectively to centre the rotor 15 relative to the pipe member 10 and to adjust the scraping effect according to need. The actions of these mechanisms can be regulated by equivalent regulation of the supply of compressed air and thereby regulation of the rotational speed of the rotor. The greater the rotational speed is, the greater the abutment force obtained between the scraper means and the cylindrical part. Correspondingly the greater the rotational speed is, the greater the abutment force or the centering force obtained between the support rollers and the cylindrical part. Provision is made for placing the scraper means axially outermost in the apparatus at opposite ends of the apparatus, so that the support rollers lying axially within can be supported against processed surfaces on the cylindrical part, independently of the direction in which the apparatus is moved longitudinally along the apparatus.

In FIG. 8 a first two branch (double arm) lever 45 is shown, which is tiltable about an axle pin 46 mounted between the side pieces 17, 18 and a second two branch (double arm) lever 47, which is tiltable about an axle pin 48 which passes through the outer end of one, short branch (arm) 45*a* of the first lever 45. The other, longest branch (arm) 45*b* of the first lever 45 has a greater weight than its short branch 45*a*, which carries a support roller 49, which is rotatably mounted on the axle pin 48, in order to ensure thereby a desirably large swinging moment to press (i.e. bias) the support roller 49 against the pipe member 10. This applies especially in connection with the centrifugal force which acts against the mechanism during rotation of the rotor. Correspondingly provision is made for a desirably large swinging moment in the longest branch (arm) 47*b* of the second lever 47 in that the longest branch has a greater weight than the short branch (arm) 47*a*, which at the outer end carries a cleaning tool in the form of a scraper means 50, in order thereby to press with a swinging moment the scraper means 50 with a suitable elastic force against the pipe member 10. As is shown in FIG. 6 two parallel levers 47 are employed in each scraper mechanism (41–44) each with its respective scraper means 50.

In practice a common scraper means can alternatively be employed which spans over the whole breadth of each lever 47 and also the intermediate space between these.

The choice is made to limit the tilting movement of the first lever 45 by means of guide means 51, 52. In this connection a guide pin 51 extends from the lever 45 laterally inwards into a guide groove 52 in the guide rail 53 which is a common guide rail for all the four levers 45 illustrated. The guide rail 53 is divided into two guide rail portions which are joint connected each with its rotor part by means of joint connections not shown further, so that the guide rail portions which can thrust endwise tightly together into a coherent annular member, are moved in the rotational movement together with the associated rotor part, but with a certain extra swinging movement relative to the rotor mender. In practice the levers 45, guided by respective guide means 51 and 52 together with guide rail 53, will be moved outwardly and inwardly relative to the cylindrical part precisely in step with each other by actuation of four separate centrifugal weights.

Correspondingly the choice is made to limit the tilting movement of the second lever 47 and this is ensured by allowing tile longest lever branch 47*b* to form a support abutment against the axle pin 46.

Instead of the illustrated mounting of the lever 47 about the rotary pin 48 it is possible to mount the lever 47 about the axle pin 46. In such a case there can be arranged for example opposite stop means (not shown further) on the lever 45 in order to ensure swinging about of the lever 47 in step with the lever 45, but with a certain possibility for swinging movement relative to the lever 47. Alternatively the lever 47 can in the end, which faces opposite the scraper means 50, be provided with a weight portion corresponding to the weight portion 45*b* of the lever 45.

Figure 9:
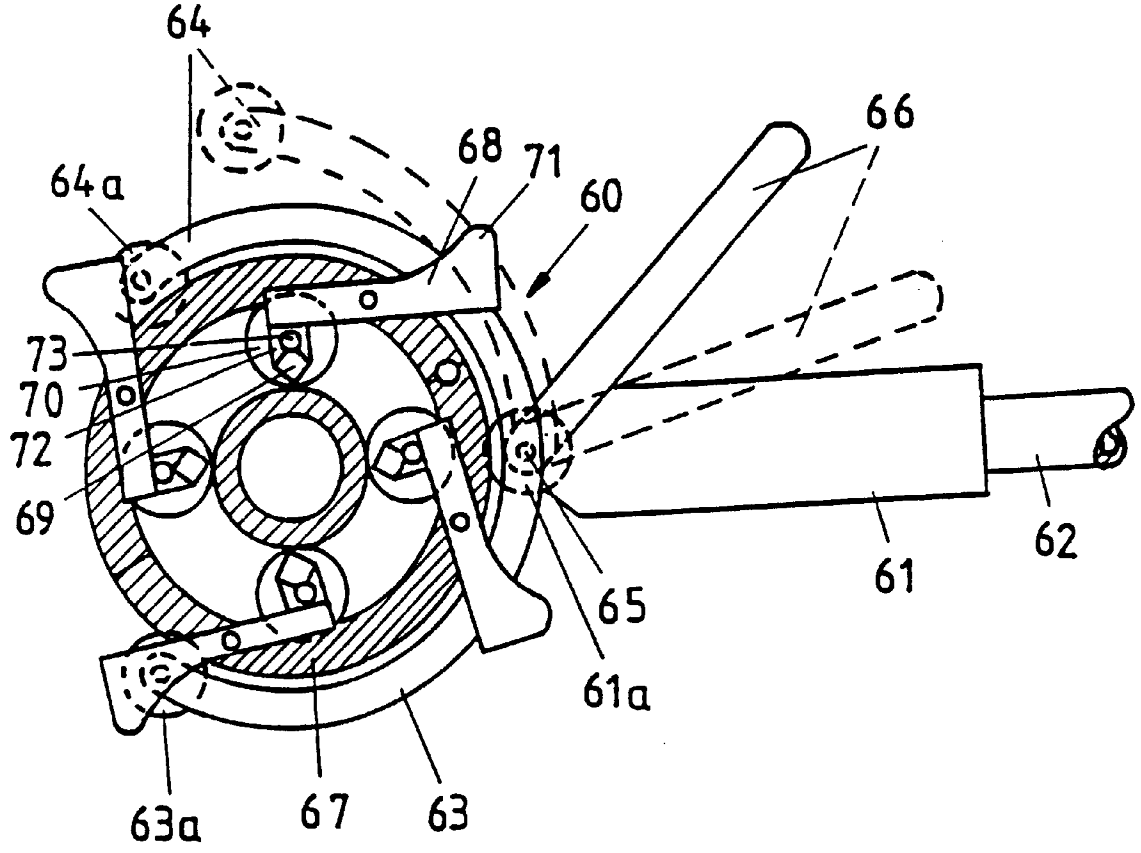

In FIG. 9 a hand tool 60 is shown, which is particularly designed for use in the cleaning of the peripheral surface on a cylindrical part, for example on a pipe-shaped section in a hand rail or the like. A handle 61 is shown having an internal mouthpiece (not shown further) which communicates with an associated air feed pipe 62. For example the mouthpiece is fashioned in and discharges into a first clamp member 63 rigidly connected to the handle 61. A second clamp member 64 is shown, which is pivotally mounted on the handle 61 about an axle pin 65 together with a handle 66. In FIG. 9 the pivotable clamp member 64 is shown in the use position by full drawn lines and by broken lines in the inactive condition, in readiness for guiding on the cylindrical part which is to be processed. The clamp members 63 and 64 are adapted to receive between them a rotor 67. The rotor 67 is rotated by means of compressed air which is supplied from the mouthpiece 62, in a corresponding manner as the rotor 15 in the embodiment of FIGS. 1–8. The clamp members 63 and 64 are equipped at the outer end with their respective support roller 63*a* and 64*a* for thrusting against the rotor 67, while a third support roller 61*a* for thrusting against the rotor 67 is rotatably mounted on the handle 61 in connection with the pin 65.

A material difference relative to the embodiment according to FIGS. 1–8 is that the apparatus according to FIG. 9 supports the rotor at three points which are displaced at an angle of 120° relative to each other. Another difference is that a carrying arm 68 is mounted for a scraper means 69, a pipe-support wheel 70 and associated counterweight 71 directly in the rotor 67. In addition fastening means 72 of the scraper means 69 and pivot 73 of the wheel 70 are connected Lo one and the same carrying arm.

What is claimed is:

1. A pipe cleaning apparatus comprising a holder means;

a rotor mounted in said holder means for rotation about a central longitudinal axis thereof;

a power-driven drive means mounted on said holder means for rotating said rotor relative to said holder means about said axis;

a plurality of centering mechanisms mounted on said rotor for centering said rotor relative to a pipe disposed within said rotor under centrifugal force during rotation of said rotor about the pipe in dependence on the speed of rotation of said rotor; and a plurality of scraper mechanisms mounted on said rotor for scraping a surface of the pipe under centrifugal force during rotation of said rotor in dependence on the speed of rotation of said rotor.

2. A pipe cleaning apparatus as set forth in claim 1 wherein each centering mechanism includes a first double arm lever pivotally mounted on said rotor on an axis parallel to said longitudinal axis and in facing relation to the pipe, said lever having a short arm and a long arm of greater weight than said short arm, and a roller rotatably mounted on said short arm to be biased against the pipe under centrifugal force during rotation of the said rotor.

3. A pipe cleaning apparatus as set forth in claim 2 wherein each scraper mechanism includes a second double arm lever pivotally mounted on said first lever on an axis parallel to said longitudinal axis and in facing relation to the pipe, said second lever having a short arm and a long arm of greater weight than said short arm thereof, and a scraper means mounted on said short arm of said second lever to be biased against the pipe under centrifugal force during rotation of said rotor.

4. A pipe cleaning apparatus as set forth in claim 3 wherein each centering mechanism has an axle pin pivotally mounting said first lever thereon and wherein said long arm of said second lever is disposed to abut against said axle pin to limit pivoting of said second lever.

5. A pipe cleaning apparatus as set forth in claim 3 which further comprises a guide rail disposed peripherally about said centering mechanisms, said guide rail having a plurality of guide grooves therein and each long arm of each first lever of each respective centering mechanism has a guide pin mounted thereon and disposed in a respective guide groove for guiding said levers of said centering mechanisms in step with each other.

6. A pipe cleaning apparatus as set forth in claim 2 wherein each scraper mechanism includes a second double arm lever pivotally mounted on said first lever on an axis parallel to said longitudinal axis and in facing relation to the pipe, said second lever having a short aim and a long arm of greater weight than said short arm thereof, and a scraper means mounted on said short arm of said second lever to be biased against the pipe under centrifugal force during rotation of said rotor.

7. A pipe cleaning apparatus as set forth in claim 1 wherein said power-driven drive means is pneumatically driven and includes a nozzle for directing compressed air onto a rim of said rotor.

8. A pipe cleaning apparatus as set form in claim 7 wherein said rim of said rotor has a plurality of recesses for facing said nozzle and receiving a flow of compressed air therefrom.

9. A pipe cleaning apparatus as set forth in claim 1 wherein said rotor is formed of two parts and includes means for securing said two parts together about a pipe.

10. A pipe cleaning apparatus as set forth in claim 1 wherein each centering mechanism includes a double arm lever pivotally mounted on said rotor on an axis parallel to said longitudinal axis and in facing relation to the pipe, said lever having one of said arms of greater weight than the other of said arms, and a roller rotatably mounted on said other arm whereby upon rotation of said rotor, said other arm of said lever of each centering mechanism is biased outwardly of said axis and said roller thereof is biased against the pipe.

11. A pipe cleaning apparatus as set forth in claim 10 which further comprises a guide rail disposed peripherally about said centering mechanisms, said guide rail having a plurality of guide grooves therein and said lever of each centering mechanism has a guide pin mounted thereon and disposed in a respective guide groove for guiding said levers of said centering mechanisms in step with each other.

12. A pipe cleaning apparatus comprising a holder means;

a rotor mounted in said holder means for rotation about a central longitudinal axis thereof;

a power-driven drive means mounted on said holder means for rotating said rotor relative to said holder means about said axis;

a plurality of arms, each said arm being pivotally mounted on said rotor on an axis parallel to said longitudinal axis and having a counterweight on one end thereof;

a plurality of wheels, each wheel being rotatably mounted on a second end of a respective arm to be biased against a pipe disposed within said rotor under centrifugal force during rotation of said rotor; and a plurality of scraper means, each scraper means being mounted on said second end of a respective arm to be biased against the pipe under centrifugal force during rotation of said rotor.

13. An apparatus as set forth in claim 1 wherein said rotor includes a pair of radially disposed flanges and which further comprises a set of support rollers mounted on said holder means and rollably engaging said flanges of said rotor.

14. An apparatus as set forth in claim 1 wherein said rotor includes a series of peripherally-spaced recesses and said drive means includes a nozzle for directing a flow of compressed air across said recesses to rotate said rotor in said holder means.

15. An apparatus as set forth in claim 1 wherein said rotor includes a pair of semi-cylindrical rotor parts, each part having a rigid rim portion and a pair of side pieces defining a groove receiving at least one of said centering mechanisms and at least one of said scraper mechanisms therein.

* * * * *

UNITED STATES PATENT AND TRADEMARK OFFICE

CERTIFICATE OF CORRECTION

PATENT NO. : 5,992,277

DATED : November 30, 1999

INVENTOR(S) : Bjørn Ove Dalseide

It is certified that error appears in the above-identified patent and that said Letters Patent is hereby corrected as shown below:

Column 1, before line 5, insert the following: -The present invention relates to an apparatus for the cleaning of the peripheral surface on a cylindrical part, such as a pipe portion forming a part of a pipe conduit.-

Column 6, line 25, change "Lo" to -to-

Column 7, line 11, change "aim" to -arm-

Signed and Sealed this

Eighteenth Day of July, 2000

Attest:

Q. TODD DICKINSON

Attesting Officer

*Director of Patents and Trademarks*